United States Patent [19]
Hirani et al.

[11] Patent Number: 5,974,194
[45] Date of Patent: Oct. 26, 1999

[54] PROJECTION BASED METHOD FOR SCRATCH AND WIRE REMOVAL FROM DIGITAL IMAGES

[75] Inventors: Anil Hirani, Tokyo; Takashi Totsuka, Chiba, both of Japan

[73] Assignee: Sony Corporation, Tokyo, Japan

[21] Appl. No.: 08/733,953

[22] Filed: Oct. 21, 1996

[30] Foreign Application Priority Data

Oct. 30, 1995 [JP] Japan .................................. 7-303420

[51] Int. Cl.⁶ .................................................. G06K 9/40
[52] U.S. Cl. ........................ 382/262; 382/254; 382/280; 382/283; 358/463
[58] Field of Search .................................. 382/254, 260, 382/262, 276, 280, 282, 283; 358/448, 463

[56] References Cited

U.S. PATENT DOCUMENTS

| | | | |
|---|---|---|---|
| 4,814,755 | 3/1989 | Johnson et al. | 340/709 |
| 4,868,884 | 9/1989 | Miyazaki et al. | 382/30 |
| 5,247,363 | 9/1993 | Sun et al. | 358/167 |
| 5,253,339 | 10/1993 | Wells et al. | 395/126 |
| 5,386,234 | 1/1995 | Veltman et al. | 348/409 |
| 5,440,652 | 8/1995 | Ting | 382/165 |
| 5,461,420 | 10/1995 | Yonemitsu et al. | 348/401 |
| 5,481,553 | 1/1996 | Suzuki et al. | 371/49.1 |
| 5,515,388 | 5/1996 | Yagasaki | 371/49.1 |
| 5,552,831 | 9/1996 | Machida et al. | 348/416 |
| 5,561,532 | 10/1996 | Ohnishi et al. | 386/47 |
| 5,574,800 | 11/1996 | Inoue et al.l | 382/149 |
| 5,596,655 | 1/1997 | Lopez | 382/173 |
| 5,604,822 | 2/1997 | Pearson et al. | 382/199 |
| 5,617,487 | 4/1997 | Yoneyama et al. | 382/199 |
| 5,630,037 | 5/1997 | Schindler | 395/131 |
| 5,687,251 | 11/1997 | Erler et al. | 382/133 |
| 5,887,082 | 3/1999 | Mitsunaga et al. | 382/199 |
| 5,892,853 | 4/1999 | Hirani et al. | 382/280 |

FOREIGN PATENT DOCUMENTS

0727910 A2  8/1996  European Pat. Off. ......... H04N 7/68

OTHER PUBLICATIONS

H. Sun et al., "Adaptive Error Concealment Algorithm for MPEG Compressed Video," SPIE vol. 1818, Visual Communications and Image Processing, Nov. 1992, pp. 814–820.

S. Lee et al., "Transmission Error Detection, Resynchronization and Error Concealment for MPEG Video Decoder," SPIE vol. 2094, Nov. 1993, pp. 195–204.

K. Popat et al., "Novel Cluster–Based Probablity Model for Texture Synthesis, Classification, and Compression", Massachusettes Institute of Technology, Media Laboratory, SPIE vol. 2094, pp. 756–768, 1993.

IEEE Transactions on Medical Imaging, vol. MI–1, No. 2, pp. 95–101, Oct. 1982, M.I. Sezan et al., "Image Restoration by the Method of Convex Projections: Part 2–Applications and Numerical Results".

Optical Society of America, vol. 6, No. 6, pp. 844–851, Jun. 1989, H. Peng et al., "Signal Recovery with Similarity Constraints".

IEEE 1994, P. Ferreira et al., "Errorless Restoration Algorithms for Band–Limited Images," pp. 157–161.

Applied Optics, vol. 21, No. 15, pp. 2758–2769, Aug. 1, 1982, J.R. Fienup, "Phase Retrieval Algorithms: A Comparison".

IEEE Transactions on Circuits and Systems, vol. CAS–22, No. 9, pp. 725–742, Sep. 1975, A. Papoulis, "A New Algorithm in Spectral Analysis and Band–Limited Extrapolation".

IEEE Transactions on Acoustics, Speech, and Signal Processing, vol. ASSP–29, No. 4, pp. 830–845, Aug. 1981, A. Jain, "Extrapolation Algorithms for Discrete Signals with Application in Specrtal Estimation".

Optical Society of America, vol. 9, No. 7, pp. 1041–1051, Jul. 1992, J. Pang et al., "Signal Recovery from Subband Energy Constraints".

IEEE Transactions on Medical Imaging, vol. MI–1, No. 2, pp. 81–94, Oct. 1982, D.C. Youla et al., "Image Restoration by the Method of Convex Projectiosn: Part 1–Theory".

Proceedings of the IEEE, vol. 69, No. 4, pp. 432–450, Apr. 1981, R. Schafer, "Constrained Iterative Restoration Algorithms".

IEEE Transactions on Signal Processing, vol. 39, No. 10, pp. 2275–2285, Oct. 1991, M. Sezan, et al., "Prototype Image Constraints for Set–Theoretic Image Restoration".

Optica ACTA, 1974, vol. 21, No. 9, 709–720, R.W. Gerchberg, "Super–Resolution Through Error Energy Reduction." (Received Sep. 13, 1973, Revision Received Jan. 15, 1974).

J. Beyerer, "Suppression of Stochastically Placed, Straight Toolmarks to Enhance Objects and Defects," Technisches Messen TM 1982—988, vol. 59, No. 10, Oct. 1, 1992, pp. 389–397.

U. S. application No. 08/816,867, Ozelik et al., filed Mar. 13, 1997.

B. Benson, "Television Engineering Handbook," McGraw Hill, New York, Publication Date Dec. 1985, pp. 2.7 & 2.8.

S. Inoue, "An Object Extraction Method for Image Synthesis," SPIE, The International Society for Optical Engineering, Conference Date Nov. 11, 1991, vol. J74–D–11, No. 10, pp. 1411–1418.

*Primary Examiner*—Thomas D. Lee
*Attorney, Agent, or Firm*—Limbach & Limbach L.L.P.

[57] ABSTRACT

The present invention is directed to a method of scratch removal from digitized images wherein a "scratched" portion of a digitized image which requires repair or noise removal, is identified and a binary mask is generated which distinguishes the defined "scratched" portion from the other portions of the digitized image. A repair window is defined which delineates the portion of the digitized image desired to be repaired of scratches or other noise. A sample window having the same dimensional attributes as the repair window, and preferably free of any scratch or other noise, is then defined. The sample window is preferably selected so as to be as close in resemblance to the repair window as possible. Image data of the repair window and the sample window are converted into the frequency domain and then processed to yield appropriate pixel data for transfer into the repair window so as to remove the scratch noise in such a way that alignment of edges, as well as textures and other details are maintained in the resulting digitized image without degrading existing non-scratched image areas.

32 Claims, 8 Drawing Sheets

PROJECTION BASED METHOD FOR SCRATCH AND WIRE REMOVAL FROM DIGITAL IMAGES

FIELD OF THE INVENTION

The present invention relates to a method for removing noise from digital images, such as for example, digitized photographic images or computer generated images(CGI). Scratches in, or debris on, old motion picture and still photographic films, as well as special effects wires, or supports, used in special effects in motion picture scenes are examples of the type of noise generated in digitized images. Further, transmission errors, or malfinctions of image recording or scanning equipment may induce noise into digital images. The the present invention is directed to resolving the issues of currently known techniques for removing such noise. This method is based upon an application of the theory of projection onto convex sets (POCS).

BACKGROUND OF THE INVENTION

With the growing proliferation of available channels for television broadcast and the increasing use of multimedia viewing platforms, many older motion picture and still frame films are likely to see increased use thru transfers to video and digital formats. Unfortunately, many old motion and still photographic films have, over the years of use and viewing, become scratched or dirtied with dust or other debris. Since high definition and digital television formats, as well as other digital multimedia formats, will allow imperfections, such as scratches or debris on the film stock to be quite noticeable to viewers there is an increasing need for a method of removing scratches from digitized images without degrading or otherwise adversely affecting the perceived quality of the image.

In motion pictures, for example, certain special effects require actors/models or objects in a scene to be suspended or supported via a wire, cable, rod or the like or so as to create the effect of, for example the actor/objecting floating aloft. Typically, the appearance of these wires, cables, rods etc. is later removed from visibility in the scene during post production via optical processing or, more typically these days, via digital processing of the digitized film. Similarly in desktop publishing it is often desirable to remove unwanted portions of an image or erase scratches or blemishes from photographs. It should be noted that the usage of the term scratch or scratch noise herein, is intended to include all of the above noted types of noise which may occur in a digitized image.

A scratch in a digitized image presents itself as unwanted pixels in the digitized image. Scratch noise typically consists of a plurality of contiguous pixels rather than small isolated groups, or clusters, of pixels. In a digitized image, scratch noise may consist of an area of pixels of, for example, 10 pixels×100 pixels, and may fall in an area of the digitized image wherein details such as textures or edges are crossed by the scratch. In order to remove the scratch from the digitized image, the pixels which make up the scratch area must be replaced with pixel data which represents, or emulates the original data. In order to effectively repair scratched areas, this pixel data should allow the resulting image to be as sharp in the scratch area as in the surrounding area. Further, continuity of prominent edges should be maintained, and textures created to replace the wire or scratch pixels should match the surrounding texture.

The effectiveness of currently known techniques of digital processing varies according to the features of the image and their relative size within the image at issue and whether they are regularly or randomly occurring. Examples of regularly occurring features include a brick wall, or fabric weave texture. Examples of randomly occurring features may include an asphalt roadway or concrete walk or sandy beach. The effectiveness of known techniques also depends upon the size and type of the scratch area. Scratches which show up as small, isolated clusters of noise pixels in smooth or blurred areas of an image are typically relatively easy to remove through known techniques such as filtering or simple cloning and painting techniques. However, existing noise removal techniques fall short where the scratch consists of a plurality of contiguous pixels or falls in a textured area of an image or in areas having prominent edges, or lines.

Currently known techniques of image noise removal can be generally categorized into two types: 1) intra-frame techniques and 2) inter-frame techniques. The difference between these two general types of techniques centers primarily on where data for replacement of noise pixels is obtained from. Inter-frame techniques typically copy pixel data needed to replace noise pixels from preceding or succeeding frames. Intra-frame techniques, on the other hand, typically utilize data within the image frame to be repaired for replacement of noise pixels.

Inter-frame methods typically fail to provide suitable results where the image/scenes at issue reflect an extreme level of camera movement or scene activity. These methods also tend to fall short where the scratch extends across several image frames, or where the damaged image frame is the only image frame available for providing data for repairing the image. Unfortunately, it is common for scratches to run across several image frames, because of the motion of typical motion picture films through a typical motion picture projector. In these situations, corresponding pixel data from a preceding/succeeding image frame is not readily available for replacement/copying to the scratched area.

Known techniques of scratch noise removal have addressed the problem of scratch removal in several ways, including: (a) low-pass and other linear filtering (b) median and other non-linear filtering, (c) statistical texture synthesis (d) cloning, i.e. copying another part of the image (e) painting manually (f) projection based methods and (g) methods based on solving simultaneous equations. However, these techniques have been less than successful in conducting scratch removal so as to yield optimum results in a variety of scratch/image situations.

Typically the presence of scratch noise appears as a sudden variation in the pixel intensities at the scratch locations when compared with the surrounding pixel intensity values. This sudden variation appears as high frequencies in the frequency spectrum of a image. By removing the higher frequencies components, the variation in pixel intensity can be reduced to thereby lessen the visibility of the scratch area within the image frame. This operation is known as low-pass filtering and involves transforming the image from the spatial or image domain into the frequency domain, filtering out a predetermined level of high frequency components and transforming the resulting image frequencies back into an image. Similar results can be achieved via an operation known as convolution which operates on the image directly without first converting it into the frequency domain. Low pass filtering is effective in reducing scratch noise from certain types of images, typically images having few details or smooth textures. This technique is not, however, effective for removing scratch noise from images having textures or very detailed areas or prominent edges. Smoothing by low-pass and similar linear filtering techniques, whereby variations in pixel intensities within a given area are averaged out, is not effective since it often results in reconstructed, or repaired, scratch noise areas being blurred and loss of detail in the repaired scratch area.

With median filtering techniques, a given pixel of a subject image is replaced with the median value of the surrounding pixels. Which pixels comprise the "surrounding" pixels of a pixel at issue is typically defined by specifying the limits of a window enclosing that pixel. For example a window of 10 pixels by 10 pixels (10×10) in which the pixel at issue is located could be used to define the "surrounding" pixels. The surrounding pixels can also be referred to as the "neighborhood" of a given pixel. The size of the window or neighborhood can be varied in accordance with the needs at hand. In applying median filtering to scratch removal where the location of the scratch is known, only the scratch pixels will be replaced by the median value of the surrounding pixels.

Median and similar non-linear filtering techniques work relatively well where the scratch area is limited to a relatively small group of isolated pixels. Typically scratches, and particularly wire noise, consist of many contiguous pixels. As a result the median value of surrounding pixels is typically the value of the scratch area itself. If a small window, or neighborhood, is chosen, scratches are typically not repaired, since the median value is typically the value of the scratch area itself. In other words, the scratch pixels values are replaced with the value of the scratch pixels. Where a larger window is chosen so as to provide a greater number of surrounding pixels, blurring of the image typically results.

In techniques based on statistical texture synthesis, an area of the damaged image at issue is analyzed and a statistical representation of the image area is developed. This statistical representation is then used to generate a synthesized texture that is similar to the analyzed area. Scratch/wire noise pixels can then be replaced with the synthesized texture. Statistical methods are based on the assumption that the relationship between pixels in a neighborhood has a statistical description which can be discovered by analysis. Thus a given pixel's characteristics are supposed to depend statistically on some or all of it's nearby pixels. Where there is a relationship between pixels which are relatively far apart in distance, the neighborhood necessary for analysis of those pixels must be relatively large. An example would be a brick wall with large bricks or a wide wire mesh photographed close-up. Typically in these methods the computational processing required increases as the number of pixels within the neighborhood on which a given pixel depends is increased. As a result these methods are not useful for textures having large features, such as, for example, the texture of an image of a typical brick wall.

Many popular image processing programs, such as for example, Adobe Photoshop™, provide a tool for copying pixels from one area of the image to another area. With these types of tools, the area of the image to be copied is typically selected, or defined, via use of a mouse, or other pointer/control device, which allows a user to manipulate a cursor or "brush" on the display screen which displays the image at issue. Using the mouse device, a source area from which pixel data is to be read, or transferred, is defined. Then a destination area to which the pixel data from the source area is to be transferred is defined. "Brush strokes", or movement of the cursor across the destination area, can be accomplished using the mouse. With each "brush stroke" pixels from the source area are copied to the destination area. This method works well when the texture, or pattern, depicted in the image at issue is random or regularly occurring in nature and has relatively small features. Small features might include, for example, spots on a piece of fruit, sand, asphalt of a road, or fabric weave. Where there are, for example, random or regularly occurring details, or patterns, depicted in the image in the form of curved or straight lines then alignment of the edges of the repaired region with that of the surrounding region is very time consuming. Repairing scratches or wires using rubber stamp painting is a task requiring lot of time and skill for many images. Since the human visual system is very sensitive to noticing problems with edges, mismatched edges are relatively easy to pick out by the human eye.

Another technique for scratch removal has been to "paint" over the pixels of the scratch by manually matching the scratch pixels with the surrounding area. This method is very time consuming and the quality of the results obtained depends heavily on the skill of the operator.

Techniques of scratch noise removal based on projection methods in the context of signal restoration have been previously used. These methods have been used to extend the frequency spectrum of band-limited signals by alternating between signal and transform domains and applying constraints of each domain. The constraints are directed to preservation of known signal values and enforcement of bandlimits. This approach has been generalized through a geometric interpretation which is generally referred to as Projection onto Convex Sets, or POCS. POCS allows the use of any information about the image, such as, for example, the range of luminance values, distinction between defined scratch areas and non-scratch areas, as long as the information can be represented as a closed convex set to be used as a constraint.

In projection based methods an image at issue is projected upon predefined constraints to find another image which closely resembles the image at issue and which is within a defined range of images which satisfy certain pre-defined constraints. The process of finding the closest image satisfying certain pre-defined constraints is known as projecting onto that constraint. Once such an image has been found, this new image, or resultant image, is projected onto the next pre-defined constraint, if any. The constraints represent information that is known about the image. In projection based methods, an image at issue may be considered as a single point in a space which has one or more dimensions. Any point on a flat surface can be described in terms of its X and Y coordinates. Further any point in a 3-dimensional space, for example a room, can be described in terms of X, Y and Z coordinates. Similarly, an image can be described as a single point in high-dimensional space. For example, an image comprised of 200 pixels by 100 pixels may be represented as a single point having 20,000 dimensions (200×100=20,000). Each dimension of the point represents one of the 20,000 pixels which make up the image. The value of each dimension represents the luminance intensity for the given pixel represented by the particular dimension. In typical gray scale imaging, a gray scale of 256 steps is often used for high quality imaging. Thus, the luminance intensity, or value, of a given pixel may range from 0–255, for example.

Through repeated projections onto various constraints an image can eventually be found that satisfies all of the constraints imposed, simultaneously. The only condition is that the constraints should represent something known as convex sets. The concept of constraints representing convex sets can be explained as follows. When a constraint is placed on, for example, a set of images that are to be considered, the set of images is reduced to a possibly smaller set than the set of all possible images. If this new, smaller set has the property that any linear combination of two images in the set yields an image which is also within the set, then the set is a convex set. This can be expressed as follows:

$$u(x)+(1-u)(y)=z \quad \text{(Equation 1)}$$

Figure 8:
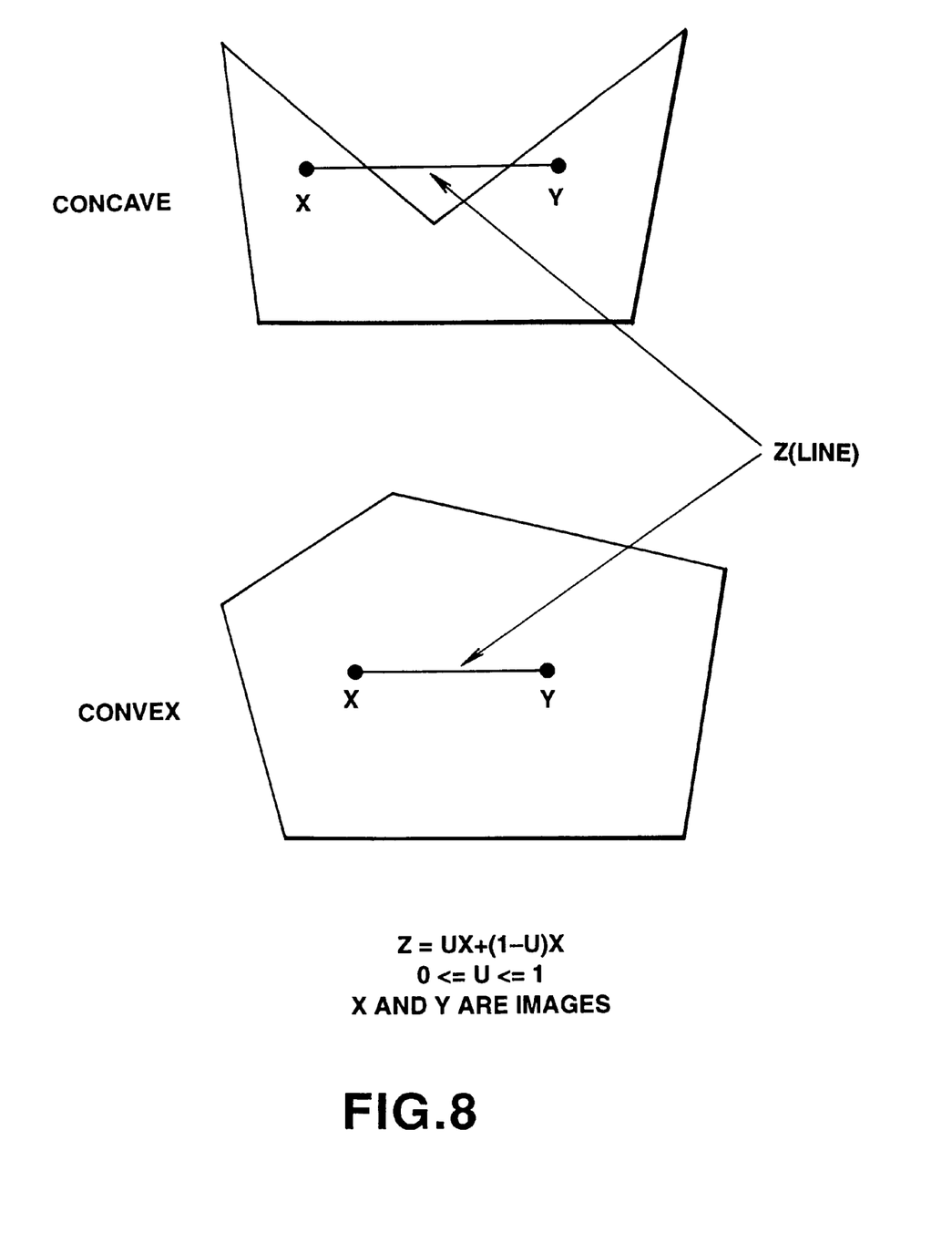
FIG. 8 illustrates a geometrical definition of Equation 1 and how it is satisfied in convex sets but not in concave sets.

If x and y are two images which are members of a set S, u is a real number between 0 and 1 inclusive, and z is also an image which is a member of the set S, then the set S is a convex set. FIG. 8 illustrates a geometrical definition of Equation 1 and how it is satisfied in convex sets but not in concave sets.

In known projection based methods of scratch noise removal, constraints such as bandlimits are imposed. An image is said to be bandlimited if the Fourier transform of the image does not have an infinite frequency spectrum. Limiting the frequency band of an image does not provide desirable results in scratch and wire removal from real images.

Other known techniques of scratch removal are based on solving simultaneous equations. These methods typically involve solving numerous simultaneous equations, often as many equations as there are pixels in the image at issue. The computational requirements to carry out this technique can be quite high. Such methods are most useful in removing blur in images. Iterative and non-iterative linear algebra based methods for scratch removal, which require the solution of only a limited number of equations, up to as many equations as there are pixels in the scratch, have been proposed. However, these methods do not work well where the scratch noise at issue consists of a plurality of contiguous pixels as is typically the case with most scratch noise.

The present invention seeks to overcome the shortcomings of the prior art and provide for a method of removing scratch noise from digitized photographic images which yields high quality results without the need for undue operator manipulation.

SUMMARY OF THE INVENTION

The present invention is directed to a method of scratch removal from digitized images wherein a "scratched" portion of a digitized image which requires repair or noise removal, is identified and a binary mask is generated which distinguishes the defined "scratched" portion from the other portions of the digitized image. A repair window is defined which delineates the portion of the digitized image desired to be repaired of scratches or other noise. A sample window having the same dimensional attributes as the repair window, and preferably free of any scratch or other noise, is then defined. The sample window is preferably selected so as to be as close in resemblance to the repair window as possible. Image data of the repair window and the sample window are converted into the frequency domain and then processed to yield appropriate pixel data for transfer into the repair window so as to remove the scratch noise in such a way that alignment of edges, as well as textures and other details are maintained in the resulting digitized image without degrading existing non-scratched image areas.

DETAILED DESCRIPTION OF THE PRESENT INVENTION

The present invention recognizes that information describing the structure of an image area to be repaired is often present in another part of the same image. Simply copying this information, pixel by pixel, or generating an average value to replace scratch area pixels yields less than desirable results. The method of the present invention utilizes known, or non-scratched portions of a repair window area, as well as the frequency spectrum of a defined sample window area, to iteratively reconstruct missing pixel information which comprises a defined image scratch area.

Figure 1:
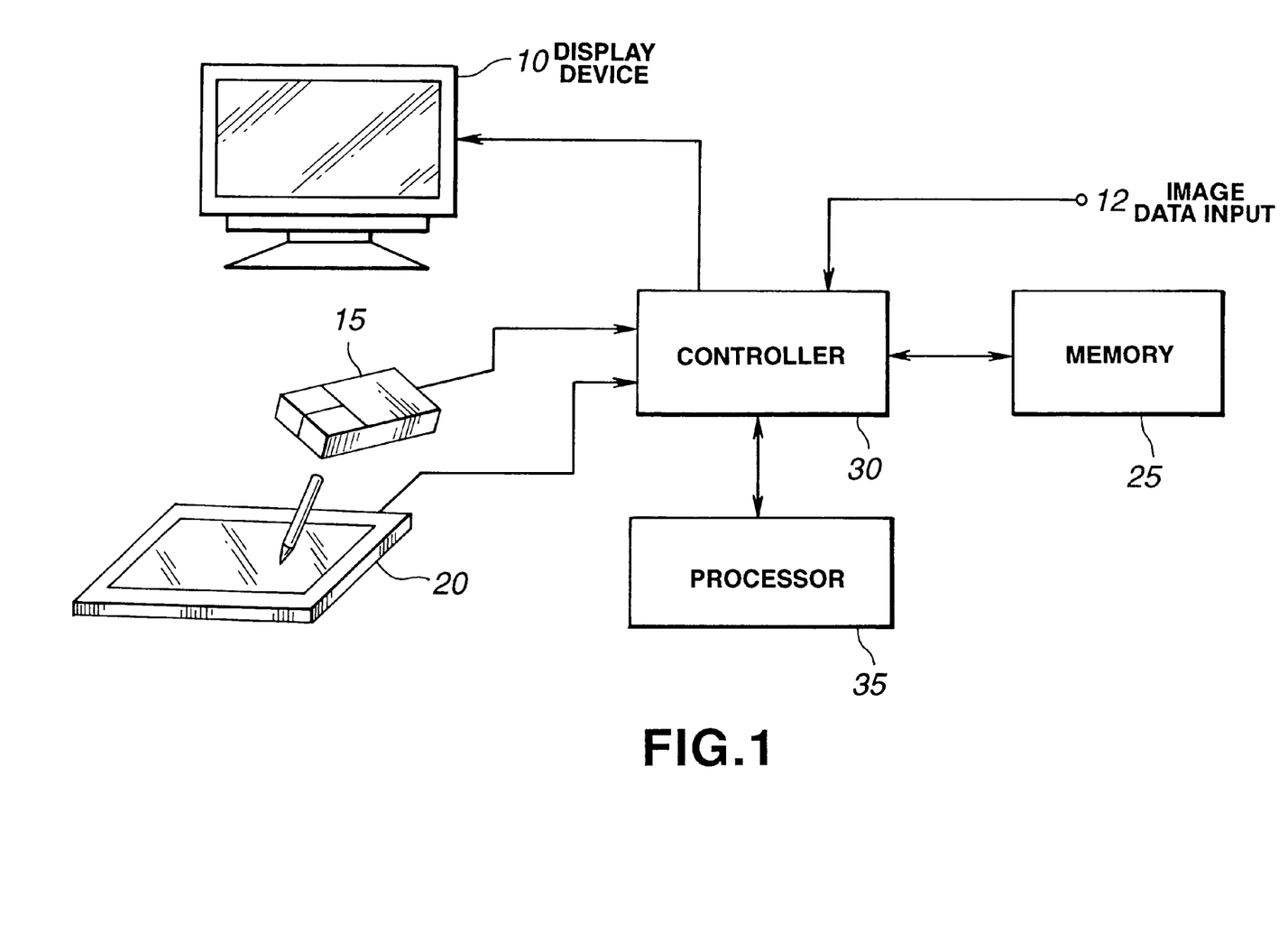
FIG. 1 is a block diagram illustrating one embodiment of the apparatus of the present invention.
Figure 2:
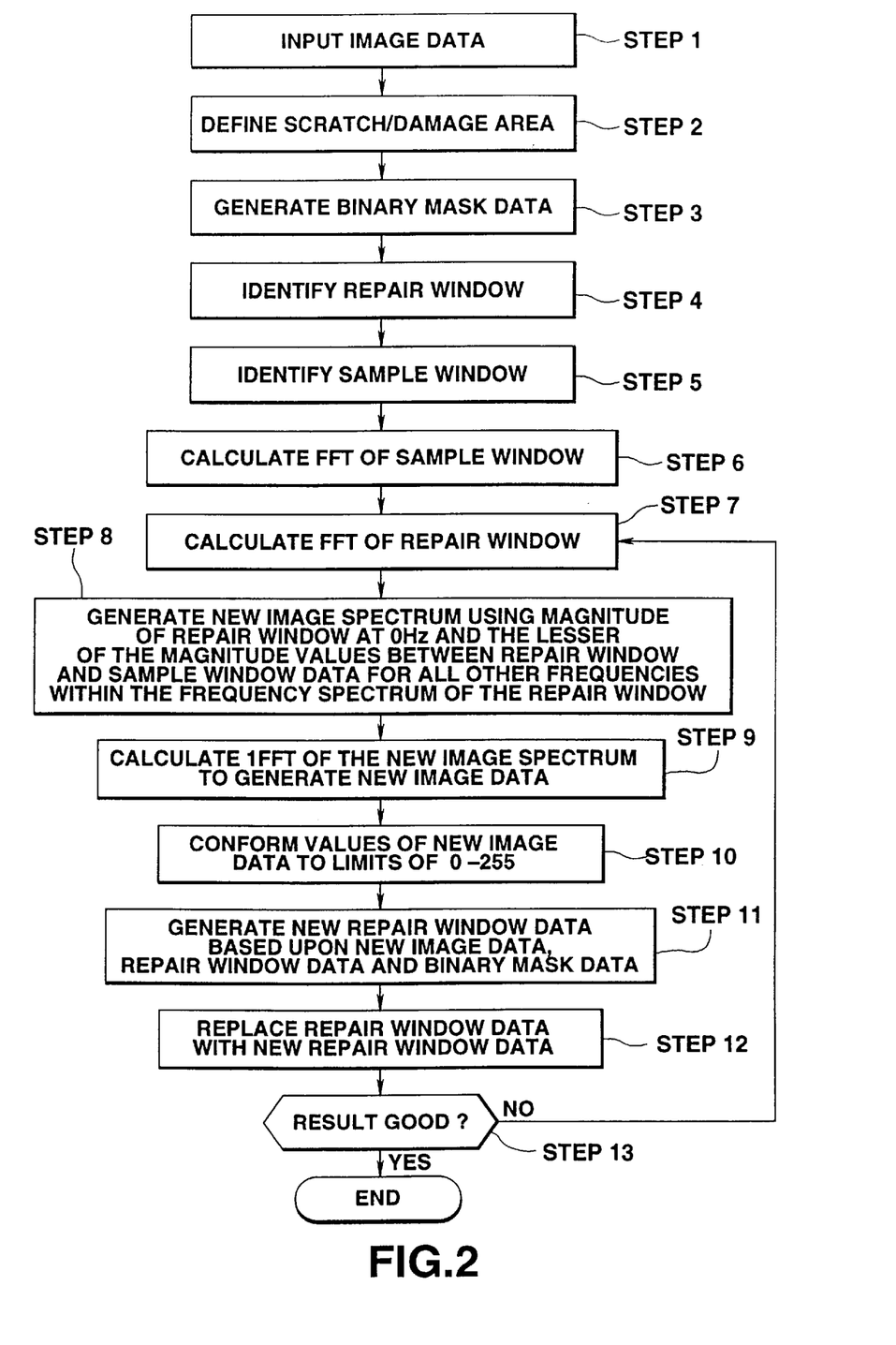
FIG. 2 is a flowchart illustrating the method of the present invention.
Figure 3:
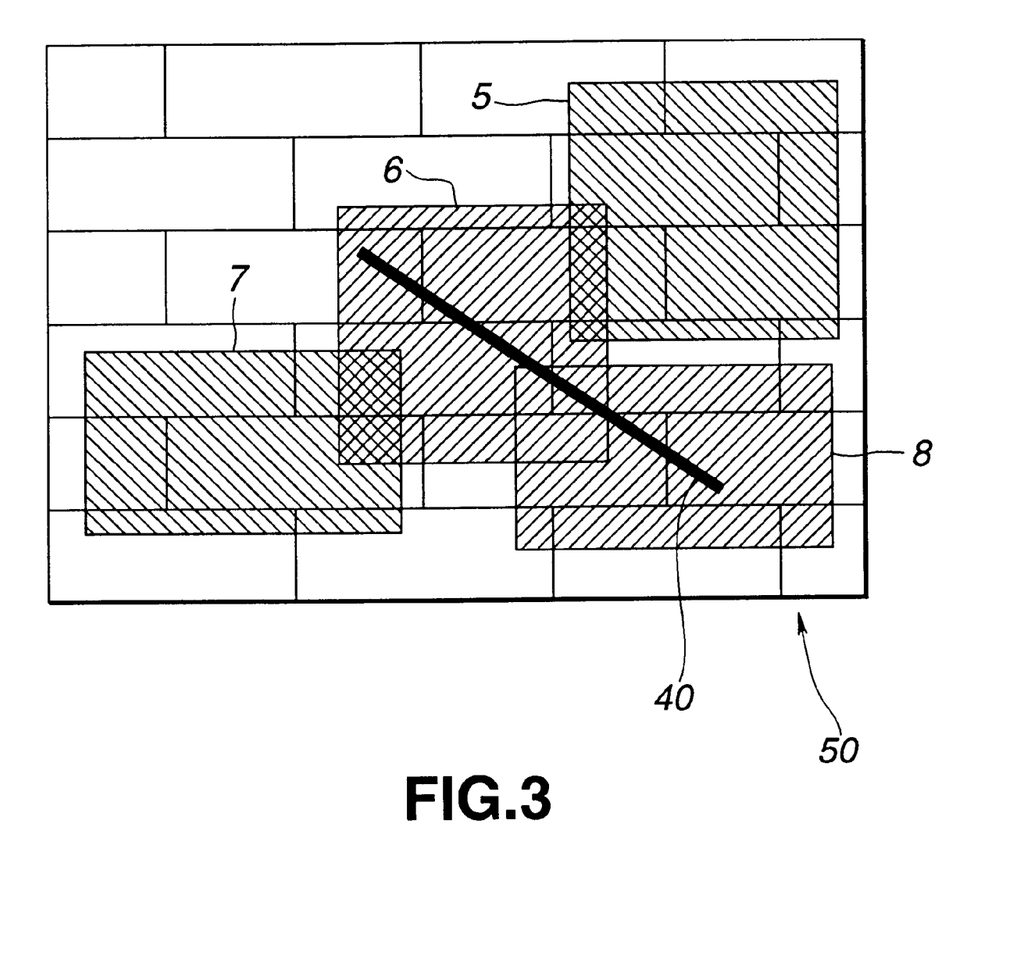
FIG. 3 is an illustration showing a relation between a defined scratch area, a repair window and a sample window.
Figure 4:
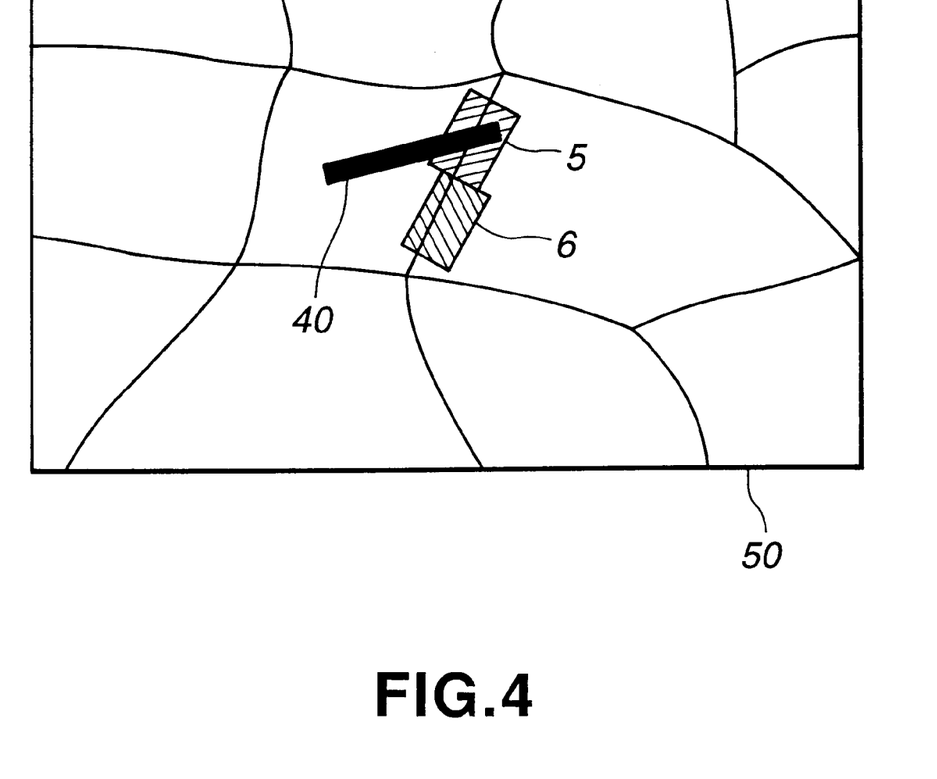
FIG. 4 is an illustration showing a relation between a defined scratch area, a repair window and a sample window.

With reference to FIGS. 1–4 an embodiment of the method of the present invention will be described. It should be noted that like reference numerals in the various figures represent like features in each diagram thereof With reference to FIG. 1 and FIG. 3 data representing an image 50 containing unwanted scratch/wire noise is input via input 12. In FIG. 3 image 50 depicts, for example, a brick wall. It will be noted that the brick wall depicted in image 50 of FIG. 3 has large, regularly occurring features, or prominent edges, which represent the mortar seams found in a typical brick wall. The corresponding image is displayed on display device 10. Using a pointing device, such as, for example, a mouse 15 or pen/tablet 20, the perimeter or area of the scratch 40 is generally highlighted, or defined, by the operator on the display device 10. In defining the scratch area an operator may use a pointer device to manipulate, or move a cursor/pen/brush across the displayed image and define the scratch area by tracing over the area of the scratch at issue. The width, as well as the shape of the cursor/pen/brush can be varied according to the operator needs or desires. The path traced by the cursor/pen/brush does not have to follow the scratch exactly as long as all pixels of the scratch are covered/highlighted.

Binary mask data is generated (Step 3) which distinguishes the defined scratch area from the other areas of the image. This binary mask data could, for example, distinguish the scratch area 40 by assigning a "1" value to each pixel of the defined scratch area and a "0" value to each pixel outside of the defined scratch area, or vice-a versa. This binary mask data is then stored in memory 25.

A repair window 6 containing at least a portion of the defined scratch area pixels is defined (Step 4). Similarly, a sample window 5 is defined (Step 5). The sample window 5 is preferably chosen to be an area of the image 50 which most closely resembles the area of the repair window 6, in terms of structure, lines, color, luminance, textures, gray values, etc. While it is preferable that the sample window be chosen to closely resemble the repair window area, it is not necessary that features and details depicted in the sample window be identically located or oriented within the sample window so as to correspond directly to the feature and detail position of the repair window. For example, in FIG. 3 in can be seen that the features and details depicted in repair window 6 are not positioned within the repair window 6 exactly as the features and details of sample window 5 are positioned. However, the features and details of sample window 6 closely resemble the features and details of repair window 5.

The sample window 5 preferably has a shape and dimensions which are identical to the repair window 6, however, it's orientation within the X/Y plane of the image 50 does not have to be identical to that of repair window 6. In other words, for example, if the repair window 6 has sides which run parallel to the X & Y axis, for example, it is not necessary that the sample window 5 also be oriented within the X/Y plane of the image so that the sides thereof run parallel to the X & Y axis thereof. The repair window 6 may be defined to be as small or large as the operator finds to be workable. Data representing the respective values of pixels within repair window 6 is stored in memory 25, as is data representing the respective values of pixels within sample window 5. Memory 25 may be comprised of a number of separate memory units or a single memory unit which is partitioned or otherwise configured so as to separately store the various data.

The present method is based upon the theory of Projection onto Convex Sets, or POCS. In applying POCS, it is important to find the right convex sets and correctly define the projections in order to obtain the desired results. The constraints $C_1$, $C_2$, $C_3$ and projections $P_1$, $P_2$, $P_3$ used in the method of the present invention are given below in Equations 2–7. In general however, the process can be described as follows.

Upon input from a user control, controller 30 causes processor 35 to retrieve repair window data, sample window data and binary mask data from memory 25. Controller 30 then causes the data representing the repair window and the sample widow, respectively, to be processed by processor 35 to calculate the Fast Fourier Transform (FFT) (Steps 6 & 7) of the sample window data and repair window data. In this way the magnitude and phase values across the frequency spectrum of the repair window and sample window are each provided. Subsequently, the magnitude values($|S|$) of the sample window frequency spectrum are compared with the magnitude values($|Rn|$) of the repair window frequency spectrum for each frequency within the frequency spectrum of the repair and sample windows. At DC, the DC magnitude value of the repair window frequency spectrum $|Rn|$ is output as the magnitude of a new resultant frequency spectrum(new image frequency spectrum). For each of the other frequencies within the frequency spectrums, the lesser of either $|S|$ or $|Rn|$ is output as the spectrum magnitude value for the resultant frequency spectrum (Step 8). Where an image/image data is shifted, the spectrum magnitude of the image is unchanged. With this in mind, the repair window can be thought of as a shifted version of the sample window. Unlike previously known methods of scratch removal, the present invention utilizes known, or unscratched, image data (repair window data) as well as the magnitude of the frequency spectrum of the sample window to reconstruct the phase information of the repair window frequency spectrum. The reconstruction of the phase information allows edges in the reconstructed or repaired scratch area to be continuous, or properly aligned, with the edges of the non-scratched area surrounding the defined scratch area.

Controller 30 controls processor 35 to process the magnitude data of the resultant frequency spectrum along with repair window phase data so as to calculate the Inverse Fast Fourier Transform (IFFT) of the resultant frequency response data (Step 9). The resultant new image data is processed by processor 35 to conform values of the new image data with predetermined constraints, such as, for example, that all values must be within a range of, for example, 0 to 255 (Step 10). Where a value falls outside of this range, processor 35 causes such value to be replaced with a value within the prescribed range. (Example:value= 276 could be replaced with value 255, the maximum defined value or some other value within the defined range). Once the resultant frequency response data has been conformed to meet the predetermined constraint, it is output as intermediate image data. This intermediate image data is then processed, along with repair window data ($r_n$) and binary mask data stored in memory 25, to produce replacement image data to replace the defined scratch area of repair window 6 (Step 11). If upon inspection of the repair window area after replacement image data has replaced the original scratch area data, the desired level of repair/image quality is not attained, the process may be repeated (Step 13). However, this time the new repair window data includes/ reflects the replacement data generated during the first iteration or pass of the process.

Calculations in accordance with the following equations are carried out as a part of respective steps of the method of the present invention. In these equations $r_0$ represents the defined repair window data which is to be reconstructed and "s" represents the sample window data.

$r_0$=defined repair window $r_{n+1}P_3P_2P_1r_n$ where $r_n$ represents the image after n iterations and $r_{n+1}$ represents the image after n+1 iterations where $n \geq 0$ and n=0 represents the starting value.

Let R and S represent the Fourier transforms of r and s respectively. Thus, R=FFT (r) and S=FFT (s), where FFT stands for the Fast Fourier Transform operation.

Constraint #1 is a convex set defined as:

$$C_1=\{r:|R(u,v)|\leq|S(u,v)|, (u,v)\neq(0,0)\} \quad \text{(Equation 2)}$$

This represents the set of all complex matrices which have a frequency spectrum wherein the magnitude of the Fourier transform must be less than or equal to the magnitude of the transform of the sample window at every frequency except d.c. At d.c. the magnitude can be anything, however, in the preferred embodiment of the present method, it is chosen to be the magnitude of the repair window. The corresponding projection $P_1(r)$ is given by the following:

where $$M_s(r) = \begin{cases} \min(|R(u, v)|, |S(u, v)|) & \text{if } (u, v) \neq (0, 0) \\ |R(0, 0)| & \text{if } u = 0, v = 0 \end{cases}$$

(This is illustrated in FIG. 2 as Step 8.) Projection $P_1(r)$ can then be defined as:

$$P_1(r)=\text{IFFT}(M_s e^{i \, phase(R)}). \quad \text{Equation 3}$$

where IFFT is the Inverse Fast Fourier Transform operation. In short the operation performed by $P_1(r)$ includes taking the FFT of r and s; creating a new spectrum magnitude by taking the minimum of $|R|$ and $|S|$ at all frequencies except d.c., where the magnitude |R (0,0)| is retained, and then, taking the IFFT of the new spectrum magnitude and leaving the phase of the repair window R unchanged.

A scratch introduces high magnitude values in the frequency spectrum of the image at issue. In most images, the spectrum of the sample window is useful only as a starting point for determining/generating data for repairing(repair data) the scratch area. Using the magnitude of the sample window frequency spectrum to replace repair window frequency spectrum as repair data would cause the information in the known, or non-scratched, portions of the repair window to be lost. Such a constraint would not represent a convex set as required by the present invention. In view of this, the minimum of the values between either the sample window or repair window values for each frequency within the frequency spectrum of the repair window, will be used as the new image data values. In this way, the effect of the scratch area can be reduced without losing all repair window frequency spectrum data. As a result degradation in the quality of non-scratched areas of the repair window is avoided. The d.c. component is retained since, taking the minimum magnitude value at d.c. can cause the overall brightness of the image to be reduced. $C_1$ is closed and convex. Note that $P_1$ is a projection because it makes the minimum change possible to make its input satisfy $C_1$.
Constraint #2 is defined as:

$$C_2 = \{r : r(j,k) \in \Im, 0 \leq r(j,k) \leq 255\} \quad \text{Equation 4}$$

where j and k represent column and row number of the pixels in the image.

Thus, $C_2$ is the set of all matrices which are real and have pixel values that are between 0 and 255, the typical range of luminance values in a 256 gray scale. To define projection #2, $P_2(q)$, it may be assumed that $q(j,k)=a(j,k)+ib(j, k)$, i.e. q is a complex array indexed by j,k. Then:

$$P_2(q(j,k)) = \begin{cases} a(j,k) & \text{if } 0 \leq a(j,k) \leq 255 \\ 0 & \text{if } a(j,k) < 0 \\ 255 & \text{if } a(j,k) > 255 \end{cases} \quad \text{Equation 5}$$

Since the output of $P_1$ may not be real and the real part may be outside [0, 255], $P_2$ converts its input to a real array and hence an image.

Where W is the set of coordinate pairs where the scratch or wire mask is 1 (W is the set of pixel locations which comprise the scratch/damaged area of the image), then, constraint #3 is defined as:

$$C_3 = \{r : r(j,k) = r_0(j,k), (j,k) \notin W\} \quad \text{Equation 6}$$

This defines a set of complex matrices which are identical to the original repair window area exclusive of the actual scratch/damaged pixel area. Let w be the binary mask which is 1 at any pixel location which comprises a part of the defined scratch/damage area and 0 at all other pixel locations. Then projection #3 (Step 11) is defined as follows:

$$P_3(r) = rw + r_0(1-w) \quad \text{Equation 7}$$

This step provides for maintaining non-scratched/non-damaged pixels of the original image, since there is no point to needlessly replacing good image data.

It will be noted that $C_1$, $C_2$ and $C_3$ are closed convex sets. Also $P_2$ and $P_3$ are projections since like $P_1$, they have been defined in such a way that they make the least amount of change in the input data necessary to make the input data confirm with the specified corresponding constraint(s).

Figure 5:
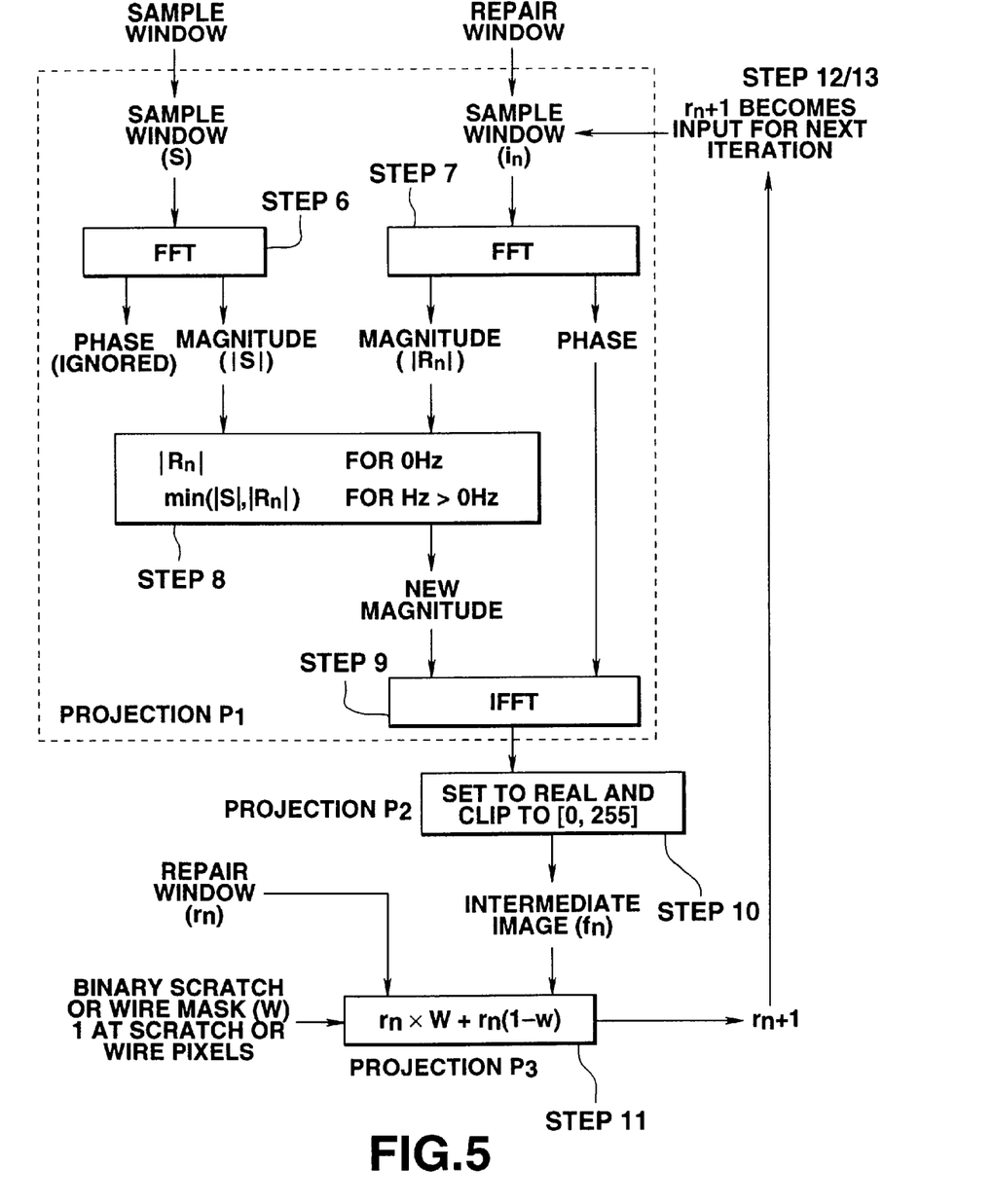
FIG. 5 is a diagram illustrating a relation ship between the steps of the present invention and defined projections and constraints.

FIG. 5 is diagram showing the relation between the projections $P_1$, $P_2$ & $P_3$ and respective steps illustrated in the flowchart of FIG. 2. It can be seen that projection $P_1$ relates to steps 6–9, while projection $P_2$ relates to step 10. Projection $P_3$ relates to step 11.

Figure 6:
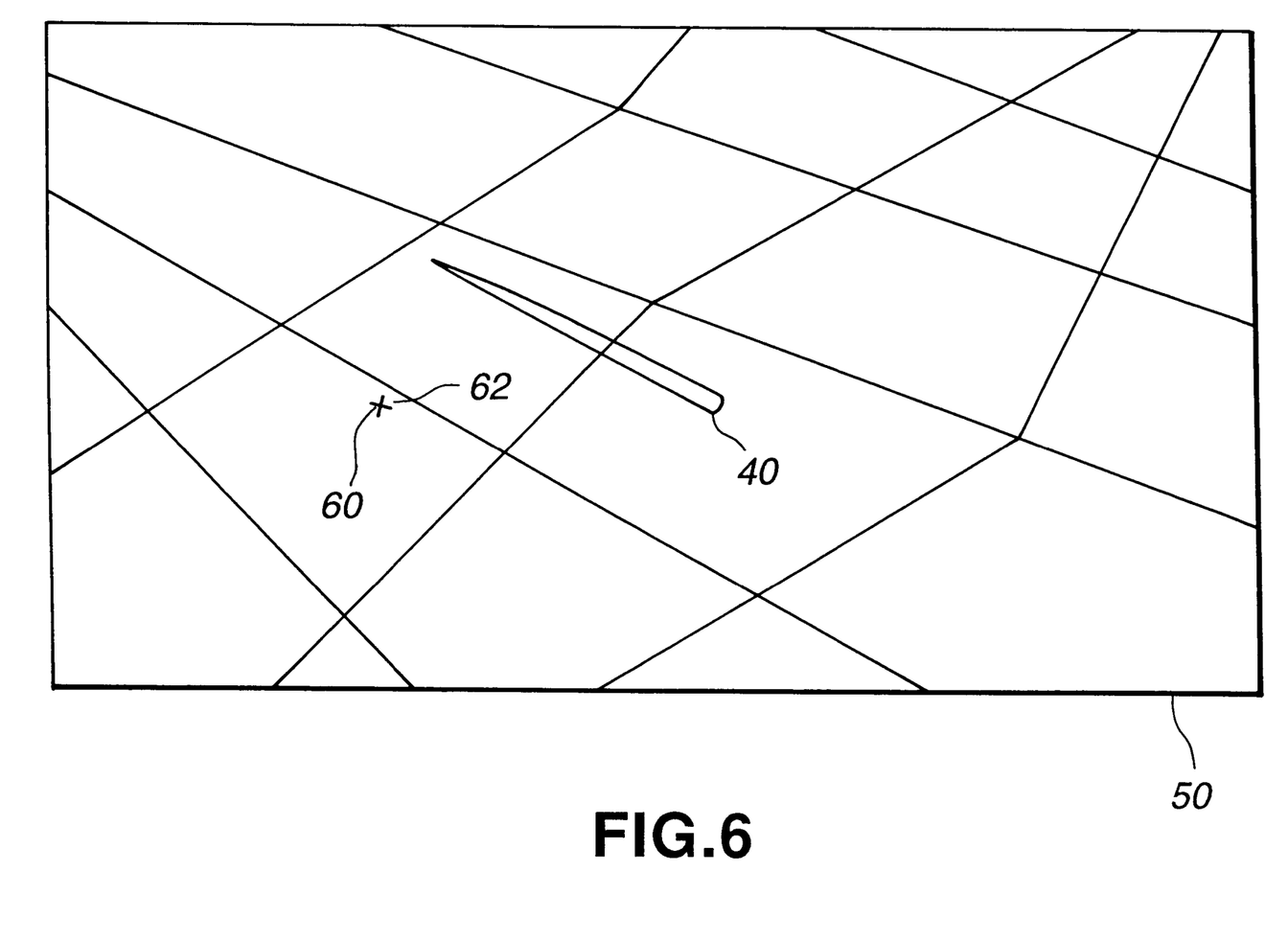
FIG. 6 is a diagram illustrating use of a cursor or brush movement to define a sample window area.
Figure 7:
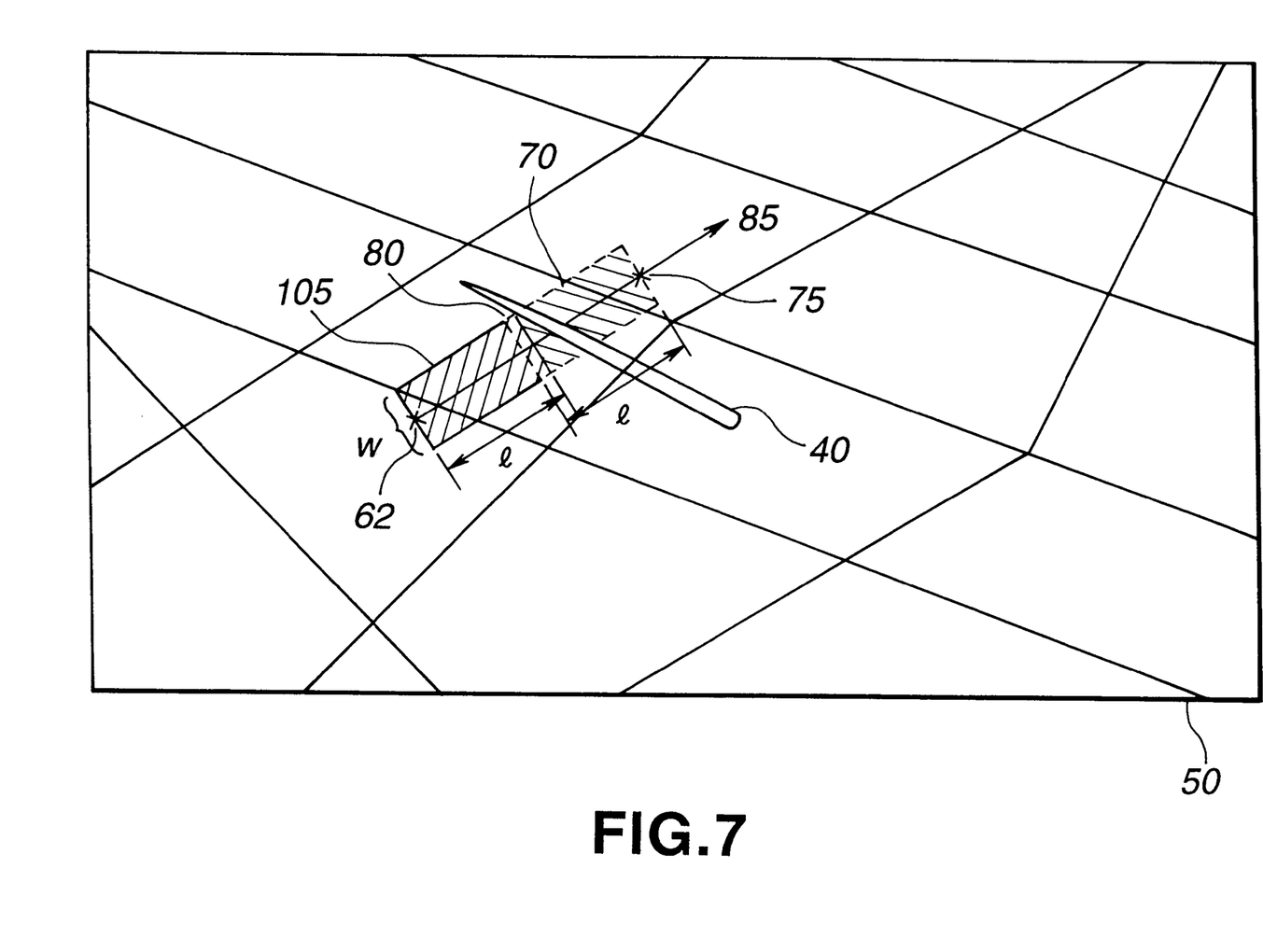
FIG. 7 is a diagram illustrating a sample window area defined via cursor or brush movement.

With reference to FIG. 2, FIG. 6 and FIG. 7, a further embodiment of the present invention will be described. This embodiment allows for the definition of a sample window 65 and repair window 70 via "brush" like strokes, or movements of a cursor, or brush tip, 60 across the scratch area of the image at issue which is displayed on the display device 10.

In this implementation a scratch area 40 of an image 50 is defined through movement of a cursor, or brush, 60 across the scratch area 40 the image 50, displayed on the display device 10. Once the scratch area 40 has been defined, binary mask data is generated which distinguishes the defined scratch/damage area of the image from the remaining areas of the image. This binary mask data is then stored into memory 25. The cursor/brush 60 is generated and displayed in accordance with controller 30 based upon input from a user input device. User input device may be, for example, a mouse 15, a trackball, joystick, pen or pen and tablet 20, or the like. Once the scratch area 40 has been defined and binary mask data generated and stored in memory, the operator can move the cursor 60 on the display device as desired from a starting point 62 outside the defined scratch area 40, inward toward the scratch area 40. The position and movement of the cursor 60 on the image/display device is monitored by controller 30 as it moves from the start point outside the defined scratch area 40 toward the scratch area 40. Once the cursor 60 reaches the outer boundary of the defined scratch area 40 (point 80), controller 30 causes a rectangular sample window 65 to be defined. This rectangular sample window 65 is, for example, as long as the distance between the start point and the point 80 on the outer boundary of the scratch area 40. The width of the rectangular sample window 65 may be predefined to be, for example, the width of the cursor 60. It may also be defined to be a predetermined number of pixels wider or narrower than the cursor 60. It may also be adjustable to meet the specific needs of the user/operator.

The repair window 70 is then defined. Since the present invention requires the dimensions of the sample window 65 and the repair window 70 to be of the same size and dimensions, controller 30 causes a repair window 70 area to be generated which abides by this size restriction. The alignment of repair window 70 is defined by moving cursor 60 to a second point 75 outside the scratch area 40 and outside the sample window area 65. The repair window 70 is generated, for example, so as to run length wise from the second point 75 back toward the point 62, along the line 85 defined thereby.

Once the sample window 65 and repair window 70 are defined, the user may utilize the cursor 60 to virtually paint, or brush, replacement pixel data into/onto the repair area 70. Replacement pixel data is generated in accordance with the above described process and calculations. Each stroke of the cursor 60 could be viewed as the equivalent of one iteration of the process of generating appropriate replacement data. Of course any number of iterations of the process could be carried out with each stroke. This would be contingent upon how many iterations are assigned to each stroke.

The description herein of the present invention has assumed an image and display resolution of 16 bits. It will be recognized that the present invention can be extended to any image/display resolution, including, but not limited to, 16 bit, 24 bit or 32 bit. With this in mind, it will be realized that at least the limits imposed by projection 2 herein (Step 10) would necessarily require adjustment in order to accommodate differing resolutions. Further, it will be recognized by those skilled in the art that the method of the present invention can easily be adapted to processing of color imaging by considering each color component/channel of a given image separately as a gray scale image, or by transforming the image so as to remove the correlations, if any, amongst the various color channels.

In view of the above description of the present invention, it will be appreciated by those skilled in the art that many variations, modifications and changes can be made to the present invention without departing from the spirit or scope of the present invention as defined by the claims appended hereto. All such variations, modifications and changes are fully contemplated by the present invention.

What is claimed:

1. A method of removing scratch noise from a digitized image, comprising the steps of:
   inputting digitized image data;
   displaying said digitized image data on a display device;
   identifying a scratch noise area in said digitized image data displayed on said display device;
   generating binary mask data which distinguishes pixels within the area of said identified scratch noise from pixels within a remainder of said displayed image;
   storing said binary mask data;
   defining a repair window area on said displayed image, wherein
      said repair window area contains identified scratch noise areas;
   storing data representing values of pixels within said repair window area;
   defining a sample window area within said displayed image, wherein
      said sample window is chosen so as to resemble the features and values of said repair window area;
   storing data representing values of pixels within said sample window;
   calculating a fast Fourier transform of said data representing values of pixels within said repair window;
   calculating a fast Fourier transform of said data representing values of pixels within said sample window;
   generating new image data in accordance with said fast Fourier transformed pixel value data of said repair window and said fast Fourier transformed pixel value data of said sample window;
   calculating an inverse fast Fourier transform of said new image data;
   conforming the values of said new image data to predefined limits;
   generating new repair window data in accordance with said new image data, said data representing values of pixels within said repair window area and said binary mask data; and
   replacing said data representing values of pixels within said repair window area with said new repair window data.

2. An apparatus for removal of scratch noise from a digitized image, comprising:
   an input for receiving digitized image data;
   a display device for displaying digitized image data;
   scratch identifying means for identifying scratch noise within a digitized image displayed on said display device;
   a processor for generating binary mask data which distinguishes identified scratch noise within a digitized image from other areas of said digitized image;
   means for identifying repair window and sample window areas;
   a first storage memory for storing data representing said identified repair window area;
   a second storage memory for storing data representing said identified sample window area;
   a third storage memory for storing said binary mask data, wherein
   said processor further comprises:
      means for calculating fast Fourier transform data for said repair window data and said sample window data;
      means for generating new image data in accordance with the fast Fourier transform data of said sample and repair windows; means for calculating inverse fast Fourier transform data for said new image data;
      means for conforming values of said new image data to predefined limits; and
      means for generating new repair window data in accordance with said new image data, repair window data and said binary mask data.

3. A method of removing scratch noise from a digitized image, comprising the steps of:
   identifying a scratch noise area in said digitized image data;
   defining repair window data which contains the identified scratch noise area;
   defining sample window data which is chosen so as to resemble the features and values of said repair window data;
   transforming said repair window data and said sample window data to data of a frequency domain;
   generating new image data based upon said repair window transformed data and said sample window transformed data;
   inverse-transforming said new image data;
   generating new repair window data based upon said new image data; and
   replacing said repair window data with said new repair window data.

4. The method of claim 3, wherein said step of transforming uses a Fourier transform.

5. The method of claim 3, further comprising the step of:
   conforming values of said new image data to predefined limits.

6. The method of claim 3, wherein said new image data is generated using a DC magnitude value of a repair window frequency spectrum.

7. The method of claim 6, wherein said new image data is generated using a smaller of a magnitude of said repair window frequency spectrum and a magnitude of the sample window frequency spectrum.

8. The method of claim 3, further comprising the steps of:
   generating mask data which distinguishes pixels within the area of said identified scratch noise from pixels within a remainder of said image, wherein
      said new repair window data is generated based upon said new image data, repair window data and said mask data.

9. The method of claim 8, wherein said mask data is binary data.

10. An apparatus for removing scratch noise from a digitized image, comprising:
   means for identifying a scratch noise area in said digitized image data;
   means for defining repair window data which contains the identified scratch noise area;
   means for defining sample window data which is chosen so as to resemble the features and values of said repair window data;
   means for transforming said repair window data and said sample window data to data of a frequency domain;
   means for generating new image data based upon said repair window transformed data and said sample window transformed data;
   means for inverse-transforming said new image data;
   means for generating new repair window data based upon said new image data; and
   means for replacing said repair window data with said new repair window data.

11. The apparatus of claim 10, wherein means for transforming uses a Fourier transform.

12. The apparatus of claim 10, further comprising:
   means for conforming values of said new image data to predefined limits.

13. The apparatus of claim 10, wherein said new image data is generated using a DC magnitude value of a repair window frequency spectrum.

14. The apparatus of claim 13, wherein said new image data is generated using a smaller of a magnitude of said repair window frequency spectrum and a magnitude of the sample window frequency spectrum.

15. The apparatus of claim 10 further comprising:
   means for generating mask data which distinguishes pixels within the area of said identified scratch noise from pixels within a remainder of said image, wherein
      said new repair window data is generated based upon said new image data, repair window data and said mask data.

16. The apparatus of claim 15, wherein said mask data is binary data.

17. A program storage device readable by a machine, tangibly embodying a program of instructions executable by the machine to perform method steps for removing scratch noise from a digitized image, the method steps comprising:
   identifying a scratch noise area in said digitized image data;
   defining repair window data which contains the identified scratch noise area;
   defining sample window data which is chosen so as to resemble the features and values of said repair window data;
   transforming said repair window data and said sample window data to data of a frequency domain;
   generating new image data based upon said repair window transformed data and said sample window transformed data;
   inverse-transforming said new image data;
   generating new repair window data based upon said new image data; and
   replacing said repair window data with said new repair window data.

18. The program storage device of claim 17, wherein said step of transforming uses a Fourier transform.

19. The program storage device of claim 17, wherein the method further comprises the step of:
   conforming values of said new image data to predefined limits.

20. The program storage device of claim 17, wherein said new image data is generated using a DC magnitude value of a repair window frequency spectrum.

21. The program storage device of claim 20, wherein said new image data is generated using a smaller of a magnitude of said repair window frequency spectrum and a magnitude of the sample window frequency spectrum.

22. The program storage device of claim 17, wherein the method further comprises the steps of:
   generating mask data which distinguishes pixels within the area of said identified scratch noise from pixels within a remainder of said image, wherein
      said new repair window data is generated based upon said new image data, repair window data and said mask data.

23. The program storage device of claim 22, wherein said mask data is binary data.

24. A recording medium having digital data recorded thereon, the recording medium being prepared by the steps of:
   identifying a scratch noise area in said digitized image data;
   defining repair window data which contains the identified scratch noise area;
   defining sample window data which is chosen so as to resemble the features and values of said repair window data;
   transforming said repair window data and said sample window data to data of a frequency domain;
   generating new image data based upon said repair window transformed data and said sample window transformed data;
   inverse-transforming said new image data;
   generating new repair window data based upon said new image data;
   replacing said repair window data with said new repair window data; and
   recording said new repair window data on the recording medium.

25. The recording medium of claim 24, wherein said step of transforming uses a Fourier transform.

26. The recording medium of claim 24, further comprising the step of:
   conforming values of said new image data to predefined limits.

27. The recording medium of claim 24, wherein said new image data is generated using a DC magnitude value of a repair window frequency spectrum.

28. The recording medium of claim 27, wherein said new image data is generated using a smaller of a magnitude of said repair window frequency spectrum and a magnitude of the sample window frequency spectrum.

29. The recording medium of claim 24, further comprising the steps of:
   generating mask data which distinguishes pixels within the area of said identified scratch noise from pixels within a remainder of said image, wherein
      said new repair window data is generated based upon said new image data, repair window data and said mask data.

30. The recording medium of claim 29, wherein said mask data is binary data.

31. A program storage device readable by a machine, tangibly embodying a program of instructions executable by the machine to perform method steps for removing scratch noise from a digitized image, the method steps comprising:

inputting digitized image data;

displaying said digitized image data on a display device;

identifying a scratch noise area in said digitized image data displayed on said display device;

generating binary mask data which distinguishes pixels within the area of said identified scratch noise from pixels within a remainder of said displayed image;

storing said binary mask data;

defining a repair window area on said displayed image, wherein
said repair window area contains identified scratch noise areas;

storing data representing values of pixels within said repair window area;

defining a sample window area within said displayed image, wherein
said sample window is chosen so as to resemble the features and values of said repair window area;

storing data representing values of pixels within said sample window;

calculating a fast Fourier transform of said data representing values of pixels within said repair window;

calculating a fast Fourier transform of said data representing values of pixels within said sample window;

generating new image data in accordance with said fast Fourier transformed pixel value data of said repair window and said fast Fourier transformed pixel value data of said sample window;

calculating an inverse fast Fourier transform of said new image data;

conforming the values of said new image data to predefined limits;

generating new repair window data in accordance with said new image data, said repair window data and said binary mask data; and replacing said repair window data with said new repair window data.

32. A recording medium having digital data recorded thereon, the recording medium being prepared by the steps of:

inputting digitized image data;

displaying said digitized image data on a display device;

identifying a scratch noise area in said digitized image data displayed on said display device;

generating binary mask data which distinguishes pixels within the area of said identified scratch noise from pixels within a remainder of said displayed image;

storing said binary mask data;

defining a repair window area on said displayed image, wherein
said repair window area contains identified scratch noise areas;

storing data representing values of pixels within said repair window area;

defining a sample window area within said displayed image, wherein
said sample window is chosen so as to resemble the features and values of said repair window area;

storing data representing values of pixels within said sample window;

calculating a fast Fourier transform of said data representing values of pixels within said repair window;

calculating a fast Fourier transform of said data representing values of pixels within said sample window;

generating new image data in accordance with said fast Fourier transformed pixel value data of said repair window and said fast Fourier transformed pixel value data of said sample window;

calculating an inverse fast Fourier transform of said new image data;

conforming the values of said new image data to predefined limits;

generating new repair window data in accordance with said new image data, said repair window data and said binary mask data;

replacing said repair window data with said new repair window data; and recording the new repair window data on the recording medium.

* * * * *